United States Patent [19]

Maeda et al.

[11] Patent Number: 5,043,598
[45] Date of Patent: Aug. 27, 1991

[54] HIGH VOLTAGE SUPPLY HAVING A VOLTAGE STABILIZER

[75] Inventors: Tsutomu Maeda; Kiyoshi Matsui; Michio Ishikawa; Takayuki Kanno; Yasushi Iwata, all of Tokyo, Japan

[73] Assignee: TDK Corporation, Tokyo, Japan

[21] Appl. No.: 407,825

[22] Filed: Sep. 15, 1989

[30] Foreign Application Priority Data

Sep. 20, 1988 [JP] Japan .................. 63-235935
Aug. 29, 1989 [JP] Japan .................. 1-224051

[51] Int. Cl.⁵ .................. H02M 3/335; H04N 5/63
[52] U.S. Cl. .................. 307/296.6; 307/282; 363/20; 363/21; 363/56
[58] Field of Search .......... 307/260, 280, 282, 296.1, 307/296.6; 328/9; 363/20, 21, 56

[56] References Cited

U.S. PATENT DOCUMENTS

| | | | |
|---|---|---|---|
| 4,323,961 | 4/1982 | Joesphson | 363/21 |
| 4,343,028 | 8/1982 | Hicks | 328/9 |
| 4,642,744 | 2/1987 | Thomas | 363/21 |
| 4,823,248 | 4/1989 | Ikeuchi et al. | 363/21 |
| 4,866,353 | 9/1989 | Haferl | 363/21 |

*Primary Examiner*—Timothy P. Callahan
*Attorney, Agent, or Firm*—Armstrong, Nikaido, Marmelstein, Kubovcik & Murray

[57] ABSTRACT

A high voltage generating circuit which includes a switching circuit for switching a DC input, a fly-back transformer whose input coil is driven by pulses delivered from the switching actuation of the switching actuation of the circuit, a rectifier circuit for rectifying the fly-back voltage generated in the output coil of the fly-back transformer, a capacitor for smoothing the rectified output, and a voltage stabilizing circuit. A diode is electrically connected to one terminal of the output coil of the fly-back transformer on the low-voltage side thereof as compared with the ground, the diode being so determined as to position in the forward direction to the direction of rectification. The voltage stabilizing circuit is formed by a voltage sensing circuit for sensing a DC high voltage output, comparing it with a reference voltage applied from a reference voltage source and generating an output of a result of comparison and a control circuit connected between the anode of the diode and the ground terminal. The control circuit is formed of a plurality of transistors including transistors controlled in response to the output from the voltage sensing circuit and a protective circuit for each of the transistors.

5 Claims, 8 Drawing Sheets

F I G. 4
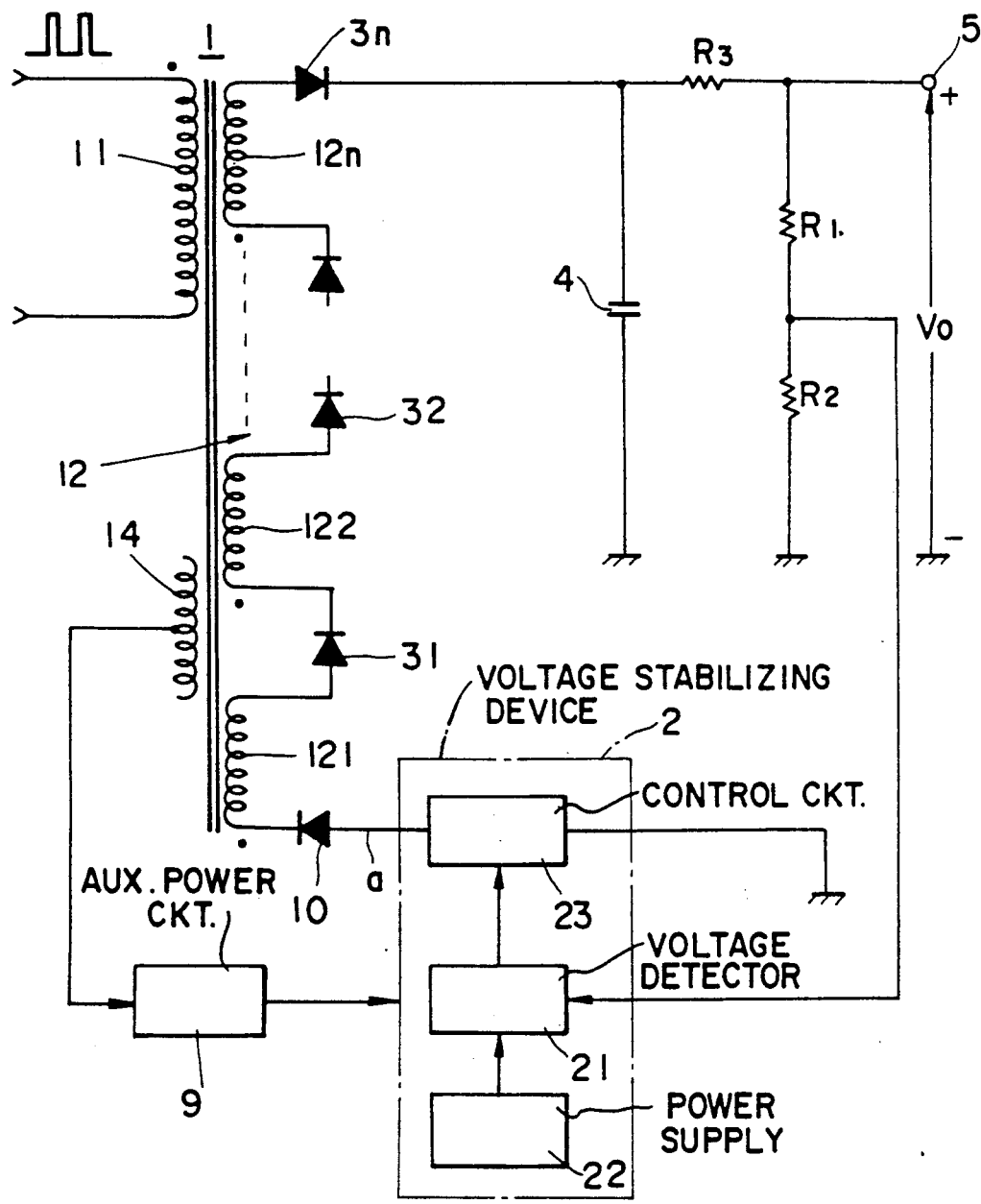

HIGH VOLTAGE SUPPLY HAVING A VOLTAGE STABILIZER

BACKGROUND OF THE INVENTION

The present invention relates to a circuit generating high voltage and, more particularly, to a circuit including a voltage stabilizer proximate to an output coil of a fly-back transformer so as to stabilize the voltage on the output-coil side, wherein a diode is electrically connected to one terminal of the output coil on its low voltage side, and the ground potential at the anode side of the diode is controlled by the device for stabilizing voltage disposed on the low voltage side so that output potential for DC high voltage may be kept at a constant thereby attaining satisfactory stabilization of the output.

In the conventional circuit generating high voltage of the preferred form, there is known an typical circuit wherein, for the purpose of stabilizing a output potential for DC high voltage thereof, a device for stabilizing high voltage is electrically connected to the high voltage side of an output coil and controll for voltage stabilization is performed on the high voltage side. FIG. 1 shows a circuit drawing of such example proposed previously by the present inventor, wherein there are included a fly-back transformer 1 and a device 2 for stabilizing voltage.

The fly-back transformer 1 has an input coil 11 and an output coil 12. The input coil 11 is normally and electrically connected to a switching element such as a transistor and the others, and a DC input is turned on and off by the switching response of such element, so that the input coil 11 is driven by pulses derived from the above process. The output coil 12 is divided plurally into the number of "n" sections, and sectional coils from 121 to 12n are connected in series to one another via diodes from 31 to 3n respectively. The direction of diodes from 31 to 3n are so determined as to position in forward direction to the fly-back voltage generated in each coil of individual section from 121 to 12n, thereby comprising a device for rectifying a fly-back voltage rectifier. The fly-back transformer 1 further has the coil 13 for control and the coil 14 for an auxiliary power supply to be used for the device 2 for stabilizing voltage. 4 illustrates a capacitor to form a smoothing circuit.

The device 2 for stabilizing voltage is electrically connected to the control coil 13 disposed in the fly-back transformer 1 so as to control for the voltage stabilization on the high voltage side. The device 2 for stabilizing voltage comprises the device 21 for detecting voltage, the power supply 22 of a base voltage, the control circuit 23 and the others. The device 21 for detecting voltage yields a required signal for detecting voltage from a voltage signal obtained by dividing in accordance with resistances R1 and R2 the output voltage Vo for DC high voltage generated at an output terminal 5, and also from a base voltage obtained from the power supply 22 for base voltage. Such device 21 for detecting voltage can be composed of a error amplifier, a comparator, and the otheres.

The control circuit 23 is supplied with the signal for detecting voltage from the device 21 for detecting voltage. This circuit 23 is electrically connected between the output terminal of a rectifying-smoothing circuit composed of a diode 6 and a capacitor 7 connected to the control coil 13, and the rectified output terminal of the sectional coil 12n positioned in the highest voltage stage of the output coil 12. One terminal of the control coil 13 is connected to the rectified output terminal of the sectional coil 12n via the diode 8.

The device 2 for stabilizing voltage is supplied with a dynamic electric power from the rectifying-smoothing circuit 9 electrically connected to the coil 14, for auxiliary power supply.

When there occurs any deviation in the output voltage Vo for DC high voltage, the voltage signal divided in accordance with resistances R1/R2 and inputted to the device 21 for detecting voltage is changed in accordance with such deviation. The device 21 for detecting voltage then functions to compare the voltage signal with the base voltage yielded from the power supply 22 for base voltage or amplifies the difference between the said two voltages and feeds to the control circuit 23 a signal for detecting voltage which is proportional to the deviation. And in response to the signal for detecting voltage fed from the device 21 for detecting voltage, the control circuit 23 controls the voltage added from the coil 13 for control to the high-voltage output terminal of the output coil 12, thereby eliminating the deviation of the output voltage Vo for DC high voltage to consequently keep the said output voltage constant.

However, in the circuit for stabilizing output mentioned above, the device 2 for stabilizing voltage is electrically connected to the high voltage side of the output coil 12, so that the ground potential of the device 2 for stabilizing voltage is rendered extremely high to eventually bring about considerable difficulties in the process for ensuring insulation. Furthermore, there exists the necessity of additionally providing the coil 13 for control to complicate the circuit configuration as a result. Besides the above, in the circuit generating high voltage mentioned above, the capacitor 4 for smoothing is electrically connected between the output terminal of the rectifying device and the ground, and the device 2 for stabilizing voltage is included within the loop of circuit comprising the output sectional coils from 121 to 12n, the device from 31 to 3n for rectifying and the capacitor 4 for smoothing. Therefore the voltage stabilizer 2 is harmfully affected by the voltage pulsation caused in the said loop of circuit to consequently increase the overshoot and the undershoot of the output potential Vo for DC high voltage while bring about another problem of prolonging the recovery time. Now an exemplary case will be described below with regard to a unit generating high voltage which produces the output voltage of 29 KV for DC high voltage. FIG. 2 shows a waveform drawing of dynamic signals in individual portions of a unit generating high voltage designed to yield a output voltage of 29 KV for DC high voltage, wherein Io represents the waveform of the output current flowed out from an output terminal 5, and Vo represents the waveform of the DC high voltage.

In the above-described circuit, as is apparent from these waveform drawings, the value deviated by high voltage resulting from the overshoot and the undershoot reaches 35 Vpp or so, and the recovery time of such overshoot and undershoot becomes longer than 2.5 msec., whereby the current is changed prior to restoration of the high voltage to the initial state. FIG. 2 shows that even after the lapse of more than 5 msec. which corresponds to the time of one cycle, the voltage is not yet responsive to the current change.

SUMMARY OF THE INVENTION

It is therefore for a first object of the present invention to provide a circuit generating high voltage of a simplified configuration capable of solving the problems mentioned above and still facilitating the process to insulate a device for stabilizing voltage.

And a second object of the present invention resides in providing a circuit generating high voltage which is adapted to solve the above problems with a function of minimizing the overshoot, undershoot and recovery time while ensuring excellent control characteristics.

In order to achieve the objects mentioned above, the circuit generating high voltage of the present invention comprises a switching circuit for turning on and off a DC input, a fly-back transformer whose input coil is driven by pulses derived from the switching dynamic behavior of such circuit, a rectifying circuit for rectifying the fly-back voltage generated in the output coil of the fly-back transformer, a capcitor for smoothing the rectified output, and a device for stabilizing voltage. In such circuit generating high voltage, a diode is electrically connected to one terminal of the output coil of the fly-back transformer on the low-voltage side thereof to the ground, wherein the diode is so directed as to become forward to the direction of rectification. And on the basis of a signal for detecting voltage obtained by detecting the output voltage for DC high voltage, the said device for stabilizing voltage has the special feature of device to control the ground potential at the anode of the said diode in the direction to keep the said output voltage for DC high voltage constant.

In such circuit configuration, the diode is electrically connected to one terminal, which is on the low-voltage side to the ground, of the output coil of the fly-back transformer, and the diode is so determined as to position in forward direction to the rectifying direction of the circuit. The device for stabilizing voltage first detects the output voltage for DC high voltage and next, on the basis of the signal for detecting voltage thus obtained, controls the ground potential at the anode side of the diode in the direction to keep output voltage for the DC high voltage constant. That is, in the circuit for generating high voltage refered to the present invention, the device for stabilizing voltage is electrically connected to the low voltage side thereof and serves to control for stabilizing voltage on the said low voltage side, so that the potential of the device for stabilizing voltage to the ground is rendered low. Therefore the required dielectric strength can be reduced to consequently facilitate the process for insulation. Furthermore, there exists no necessity of providing any coil for control to eventually simplify the circuit configration.

In order to achieve the second object described above, the device generating high voltage refered to the present invention has the special feature that the smoothing capacitor in the circuit designed to attain the said first object is electrically connected between the output side of the said rectifying circuit and the said anode side of the said diode.

In such circuit configuration where the smoothing capacitor is electrically connected between the output side of the rectifying circuit and the anode side of the said diode, the device for stabilizing voltage is eliminated from the loop of rectifying-smoothing circuit and control for the voltage stabilization can be performed without being harmfully affected by the pulsation concerned with the dynamic behavior of rectification and smoothing. As a result, it becomes possible to accomplish an improved device generating high voltage with excellent control characteristics including minimized overshoot and undershoot and a shortened recovery time.

BRIEF DESCRIPTION OF THE DRAWINGS

FIG. 4 is a circuit drawing of the circuit generating high voltage contrived to achieve the first object of the present invention;

DETAILED DESCRIPTION OF THE PREFERRED EMBODIMENT

Figure 1:
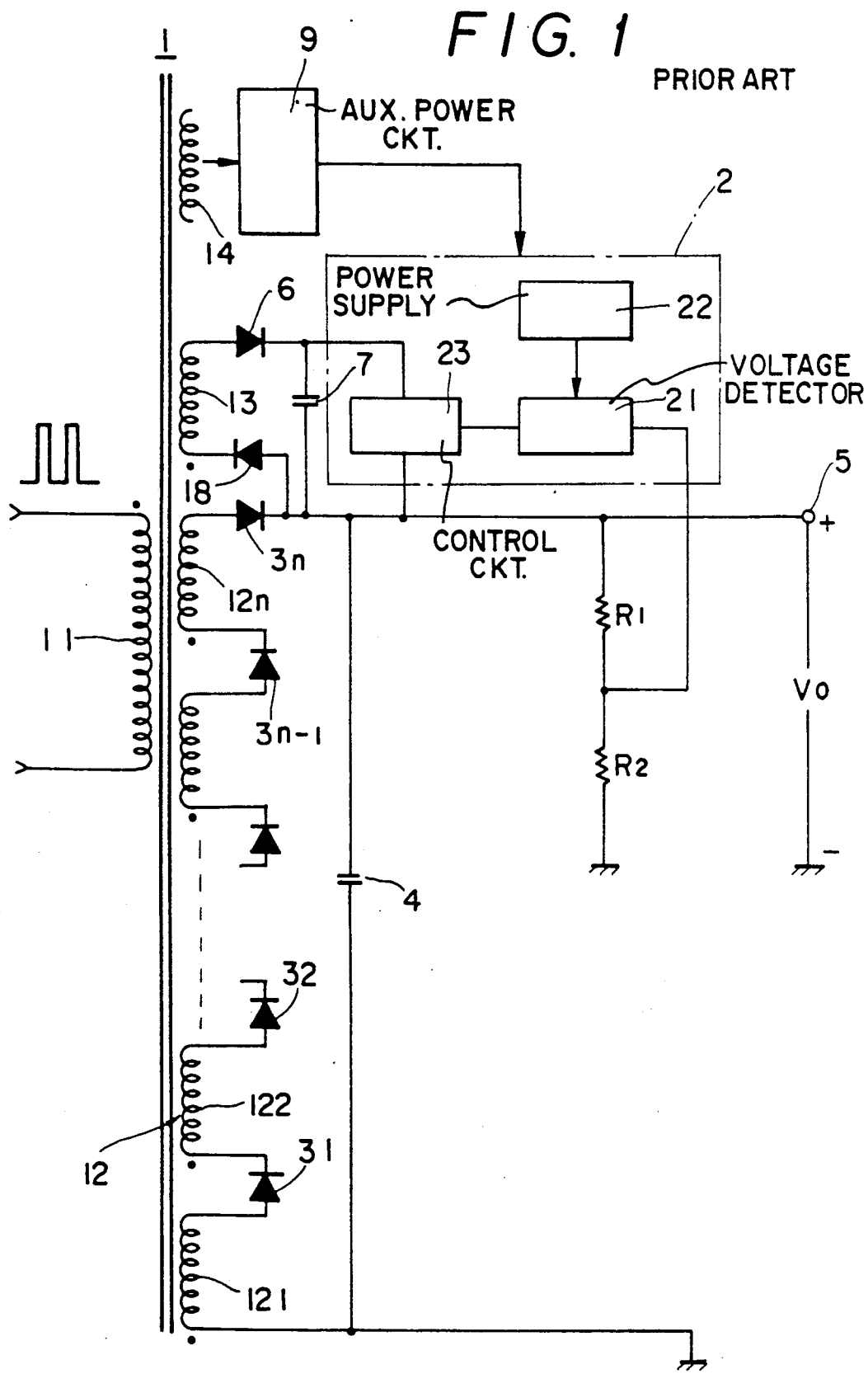
FIG. 1 is a circuit drawing of the known circuit generating high voltage proposed previously by the present inventors.
Figure 2:
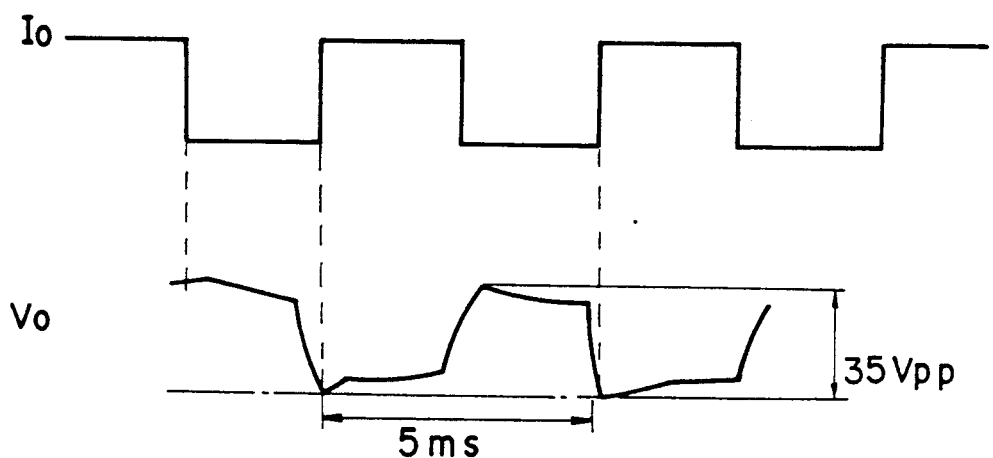
FIG. 2 is a waveform drawing relative to the dynamic behavior of the circuit shown in FIG. 1.

FIG. 4 is a circuit drawing of a circuit generating high voltage designed to achieve the first object of the present invention. A diode 10 is electrically connected to one terminal of a sectional coil 121 which is included in an output coil 12 of the fly-back transformer 1 and is positioned on the low voltage side thereof to the ground. The diode 10 is so determined as to be positioned in a forward direction with respect to the rectifying direction of a circuit formed of diodes from 31 to 3n. R3 illustrates a resistance.

The voltage stabilizer 2 includes a control circuit 23 inserted between the anode a of the diode 10 and the ground. The said control circuit 23 can be comprised of a element having capability of controlling three terminals and so forth such as a transistor and others.

Figure 5:
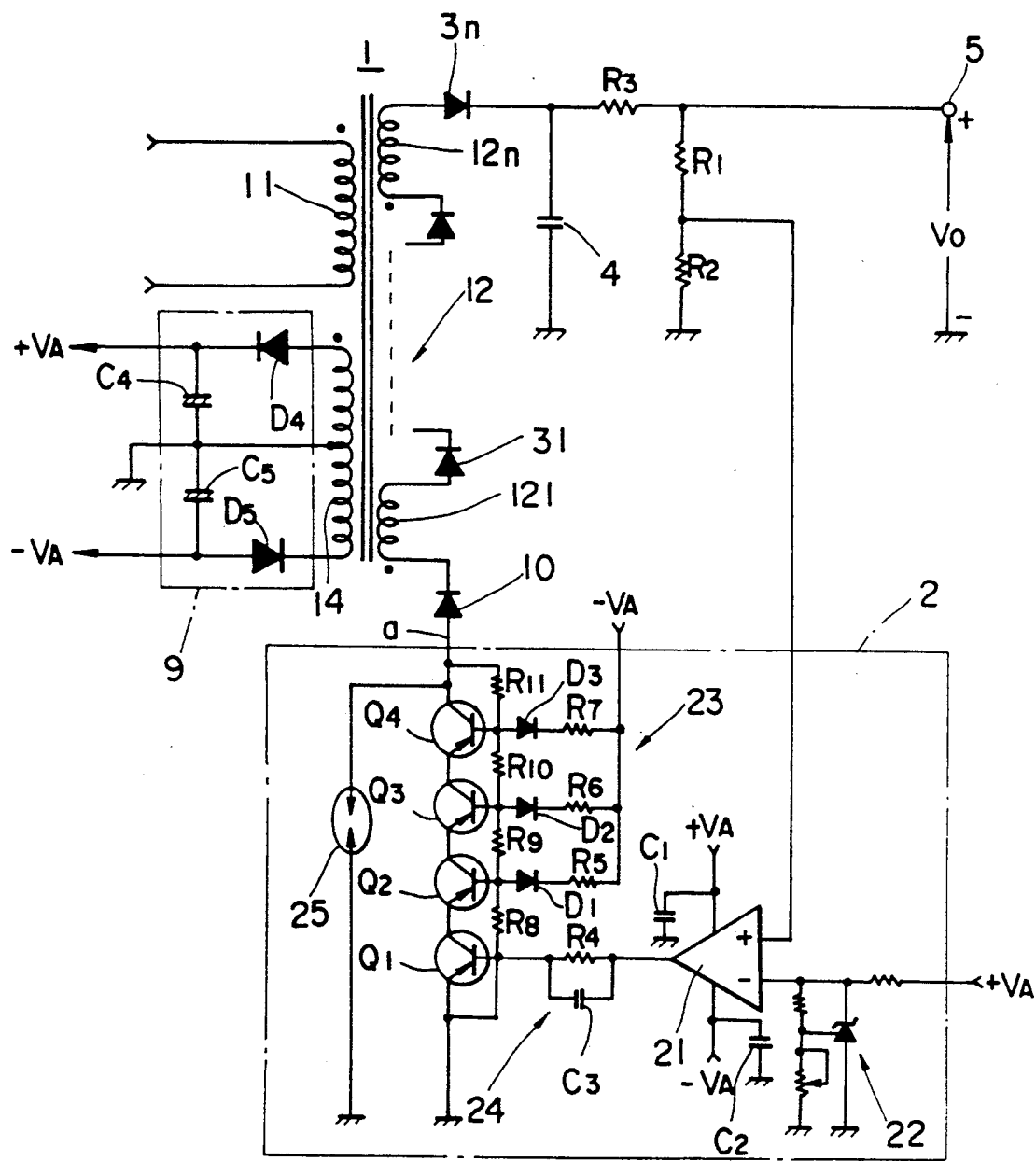
FIG. 5 is an exemplary and specific circuit drawing of the circuit generating high voltage shown in FIG. 4.

FIG. 5 shows the further exemplary and specific circuit configuration of the high voltage generator according to the present invention. In FIG. 5, the same reference numerals and symbols as those used in FIG. 4 denote the same or equivalent parts comprised. The voltage detector 21 included in the voltage stabilizer 2 is comprised of an error amplifier. There are also shown capacitors C1, C2; and voltages $+V_A$, $-V_A$ for dynamic power supply of positive and negative. The power supply 22 for providing base voltage is comprised of a shunt regulator.

In the control circuit 23, a plurality of transistors from Q1 to Q4 are electrically connected in series between the anode a of the diode 10 and the ground, and the base of the transistor Q1 positioned at lowest stage is driven by the output of the device 21 for detecting voltage. Meanwhile each of the other remaining transistors from Q2 to Q4 is driven with a proper bias applied thereto. Resistances from R5 to R11 and diodes from D1 to D3 comprise a bias circuit. 24 illustrates a circuit for speed-up comprised of a resistance R4 and a capacitor C3 electrically connected in parallel to each other. And a gap 25 is applied for protecting the transistors from Q1 to Q4.

An auxiliary power circuit 9 has a center tap in the coil 14 for an auxiliary power supply which is electrically connected to a rectifying-smoothing circuit comprised of a diode D4 and a capacitor C4, and also to another rectifying-smoothing circuit comprised of a diode D5 and a capacitor C5, thereby yielding a positive and dynamic supply volatage $+V_A$ and a negative and dynamic supply voltage $-V_A$ respectively.

Upon occurrence of any deviation in the output voltage Vo for DC high voltage in the embodiments of FIGS. 4 and 5, the voltage signal divided in accordance with the resistances R1, R2 and inputted to the device 21 for detecting voltage is also changed in accordance with such deviation. The device 21 for detecting voltage compares such voltage signal with a base voltage supplied from the power supply 22 for providing base voltage or amplifies the difference therebetween and feeds to the control circuit 23 a signal for detecting voltage proportional to the deviation. And on the basis of the signal for detecting voltage yielded from the device 21 for detecting voltage, the control circuit 23 controls the ground potential at the anode a of the diode 10 in the direction to keep the output voltage Vo for high voltage constant.

Figure 6:
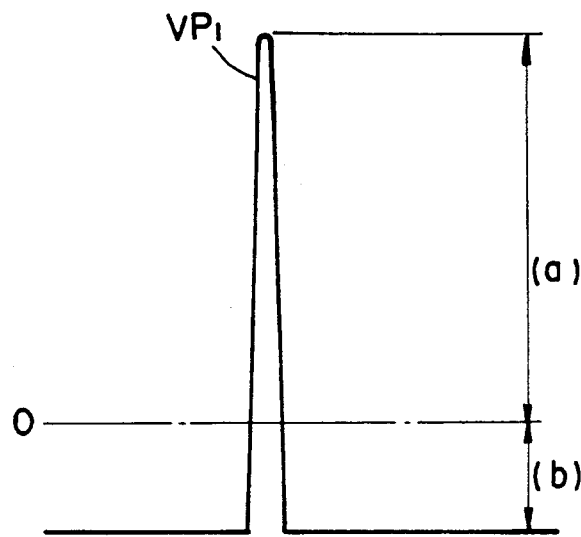
FIG. 6 is a waveform drawing of a pulse obtained from the coil at section having the lowest potential in the circuit of FIG. 5.

The fly-back voltage VP1 generated from the sectional coil 121 has a pulse waveform as shown in FIG. 6. In this drawing, a positive region (a) as compared with the ground potential 0 is rectified by a diode 31 electrically connected to the sectional coil 121, while a negative region (b) as compared with the ground potential 0 is rectified by a diode 10. Control of the potential at the anode a of the diode 10 by the device 2 for stabilizing voltage signifies control of the range of the negative region (b) in the pulse waveform of FIG. 6.

Figure 7:
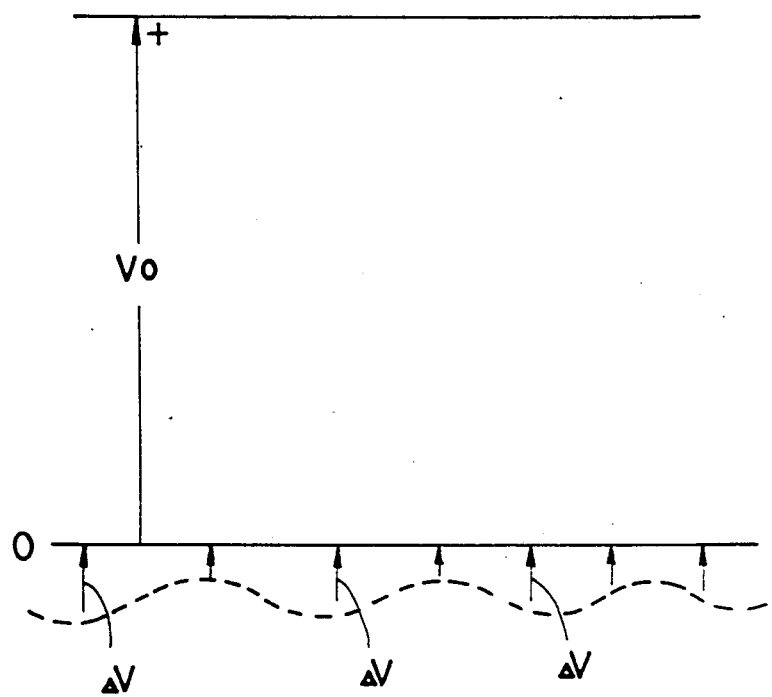
FIG. 7 is a drawing to explain how the voltage is stabilized in the circuit of FIG. 5.

FIG. 7 is a conceptional drawing graphically illustrating the voltage stabilization of the device generating high voltage according to the present invention, wherein the ground potential is supposed to deviate with respect to the base of the output voltage Vo for DC high voltage generated at the output terminal 5. When the potential of the output terminal 5 deviates by a value $\Delta V$ as compared with the ground, such variation $\Delta V$ is absorbed by controlling the ground potential at the anode a of the diode 10, so that the potential is adjusted to the preset value 0. In this manner, the output voltage Vo for DC high voltage can be kept constant at a fixed value. In this embodiment, the process for ensuring insulation is facilitated since the device 2 voltage for stabilizing is electrically connected to the low voltage side of the output coil 12 as compared with the ground potential. Furthermore, the circuit configuration can be simplified because of the unnecessity of any control coil.

Figure 8:
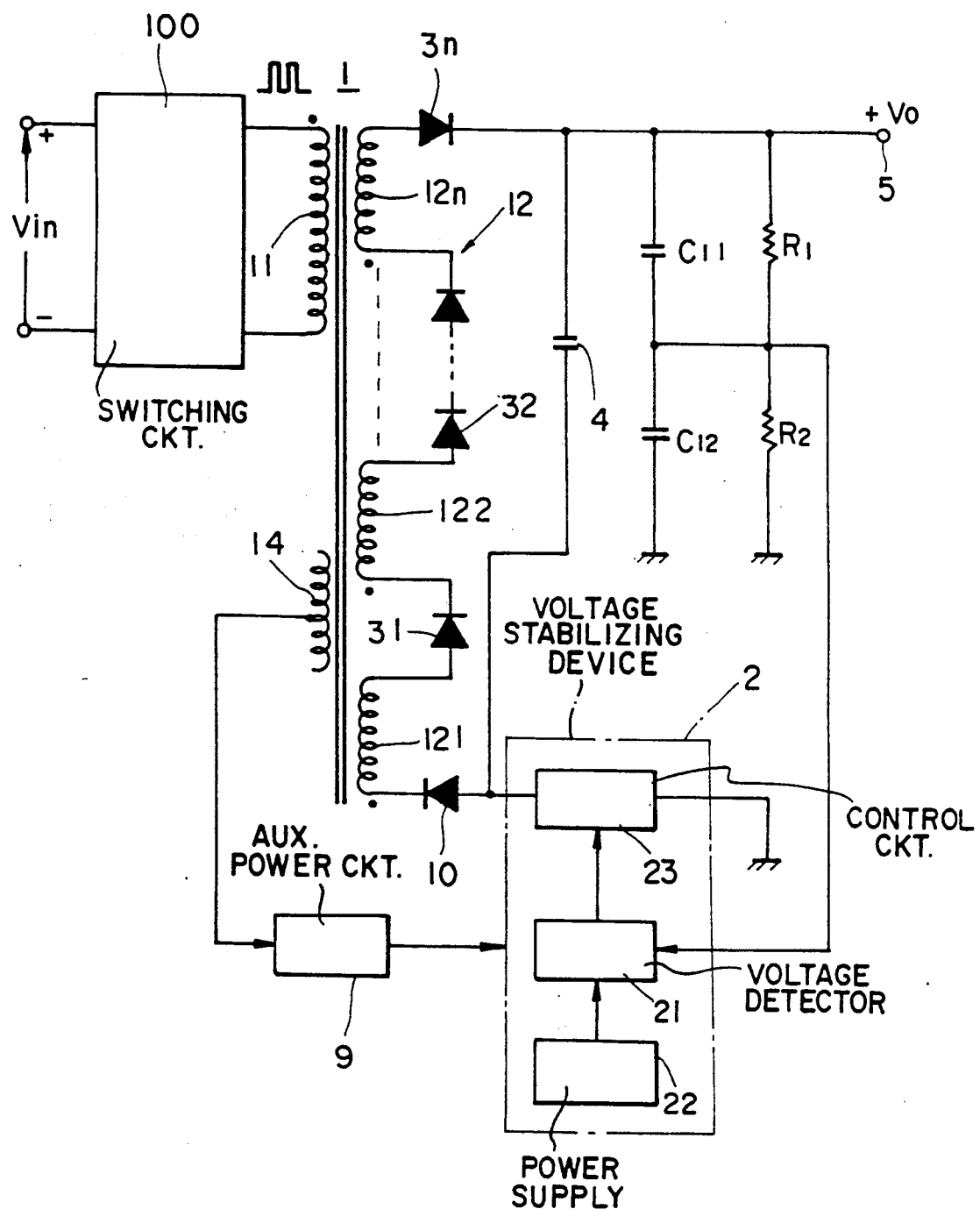
FIG. 8 is a circuit drawing of another circuit generating high voltage contrived to achieve the second object of the present invention.

FIG. 8 is a circuit drawing designed for achieving the second object of the present invention. In this drawing, the capacitor 4 for smoothing is electrically connected between the output-side cathode of the diode 3n and the anode side of the diode 10 comprising a rectifying circuit.

Figure 3:
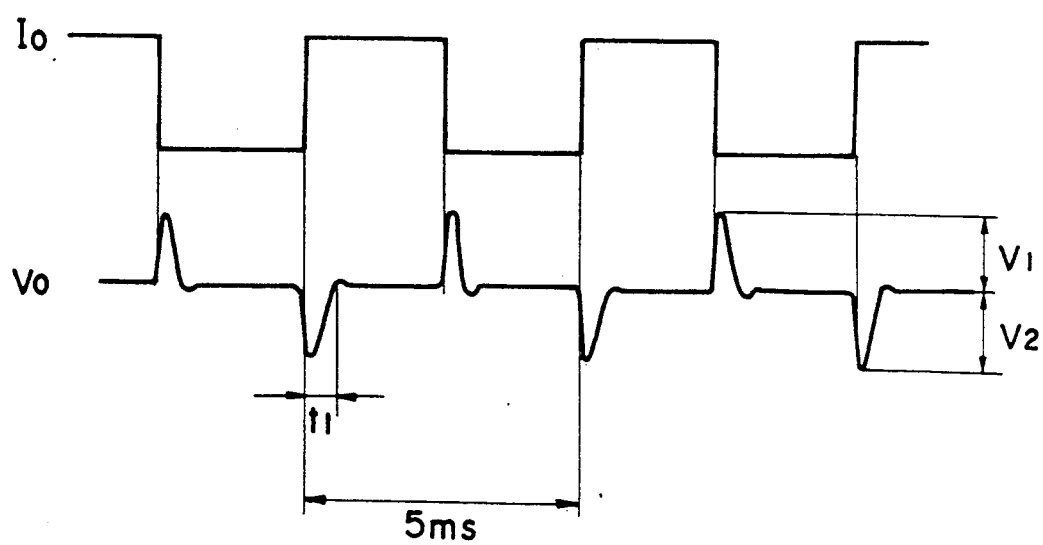
FIG. 3 is a waveform drawing relative to the dynamic behavior of the circuit generating high voltage according to the present invention.

Therefore the device 2 for stabilizing voltage is eliminated from the loop of rectifying-smoothing device which is comprised of the diodes from 31 to 3n of the rectifying circuit and the capacitor 4 for smoothing, so that the control for voltage stabilization can be performed without being harmfully affected by the pulsation concerned with the rectification and smoothing dynamic behavior. As a result, it becomes possible to accomplish an improved device generating high voltage with excellent control characteristics including small overshoot and undershoot and having a short recovery time. Describing such advantages with reference to FIG. 3, the response characteristics attained are remarkably satisfactory including the overshoot V1 and the undershoot V2 of 3 volts respectively and the recovery time t1 of 0.3 msec.

Furthermore, in the device 21 for detecting voltage used in this embodiment, the capacitors C11 and C12 are electrically connected in parallel to the resistances R1 and R2 which are used to divide the output voltage Vo for Dc high voltage. In the aforementioned known circuit (FIG.1) where the voltage divided by the resistances R1 and R2 is utilized as a signal for detecting voltage, the deviation caused in the output voltage Vo for DC high voltage fails to be directly divided due to the harmful influence of the distributed capacity of the resistances R1 and R2, so that the deviation of the signal for detecting voltage which is inputted to the device 2 for stabilizing voltage is rendered smaller to consequently increase the deviation of the high voltage output. However, in the case of the electrical connection of the capacitors C11 and C12 in parallel to the resistances R1 and R2 respectively, the harmful influence from the distributed capacity of the resistances R1 and R2 can be reduced to eventually decrease the deviation of the high voltage output. The constant values of the resistances R1, R2 and the capacitors C11, C12 are so determined as to satisfy the following relationship:

$$R1:R2=C12:C11$$

Then a balance is attained between the voltage applied to the resistance R1 and the voltage to the capacitor C11, and also between the voltage applied to the resistance R2 and the voltage to the capacitor C12.

Figure 9:
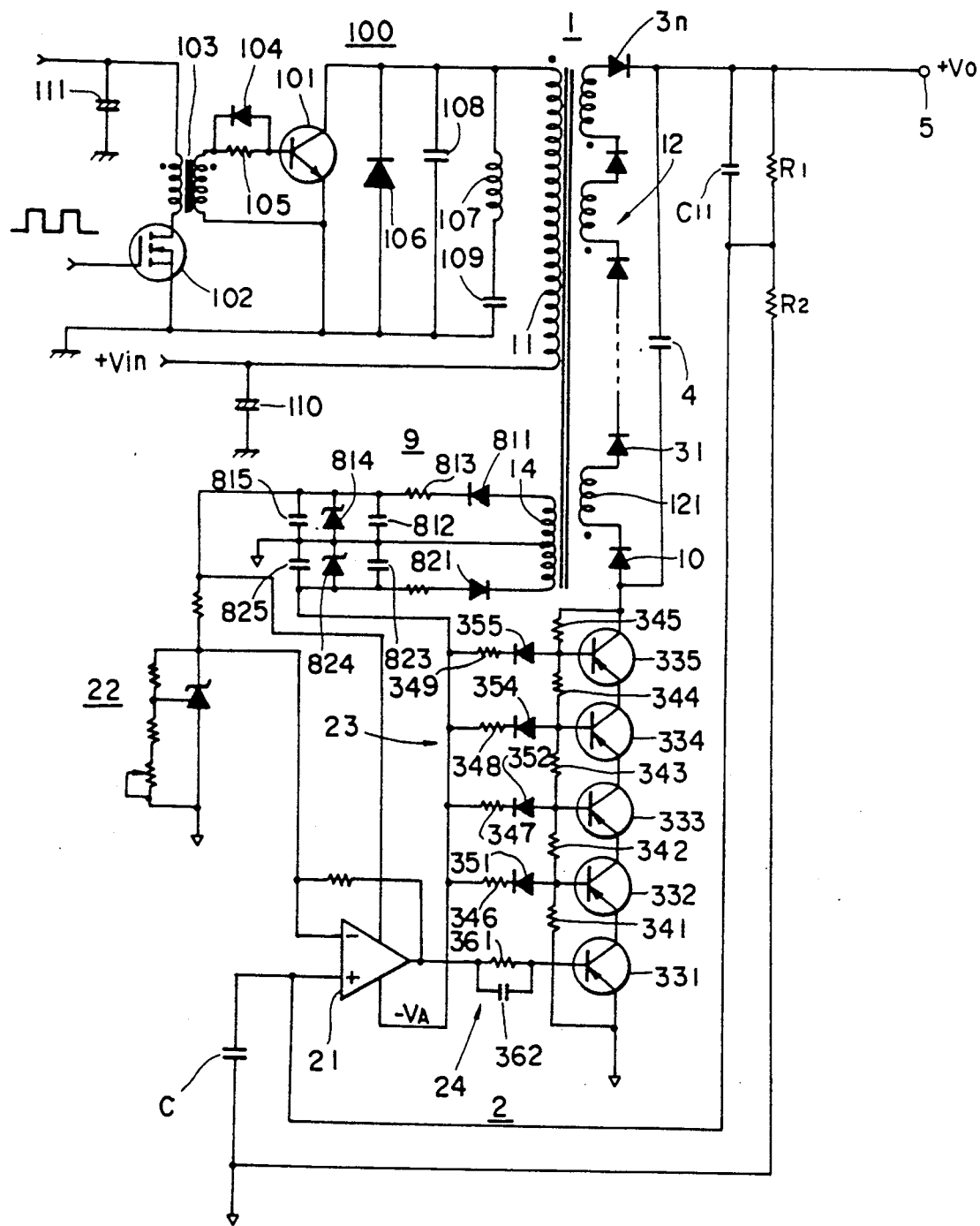
FIG. 9 is an exemplary and specific circuit drawing of the circuit generating high voltage shown in FIG. 8.

FIG. 9 shows a further specific circuit configuration of the device generating high voltage refered to the present invention. In this circuit drawing, the same reference numerals and symbols as those used in FIG. 8 denote the same or equivalent parts comprised. In the switching circuit 100, the transistor 101 serving as a main switching element is driven by the field effect transistor 102 via the pulse transformer 103. The transistor 101 has its collector electrode electrically connected in series to an input coil 11 of the fly-back transformer 1, so as to switch a DC input $V_{in}$ supplied thereto via the input coil 11. A parllel circuit of the diode 104 and the resistance 105 is electrically connected to the base of the transistor 101. There are also shown the diode 106, the inductor 107, and capacitors from 108 to 111.

The device 21 for detecting voltage included in the device 2 for stabilizing voltage is comprised of a error amplifier, and the power supply 22 for providing base voltage is comprised of a shunt regulator.

In the control circuit 23, a plurality of transistors from 331 to 335 are electrically connected in series between the anode a of the diode 10 and the ground, and the base of the transistor 331 positioned at lowest stage can be driven by the output of the device 21 for detecting voltage. Meanwhile each of the other remaining transistors from 332 to 335 is actuated with a proper bias applied thereto. Resistances from 341 to 349 and diodes from 351 to 354 comprise a bias circuit. 24 illustrates a circuit for speed-up comprised of the resistance 361 and the capacitor 362 electrically connected in parallel to each other.

The auxiliary power circuit 9 has a center tap in the coil 14 for an auxiliary power supply which is electrically connected to a rectifying-smoothing circuit comprised of the diode 811 and the capacitor 812, and also to another rectifying-smoothing circuit comprised of the diode 821 and the capacitor 822, thereby producing a positive voltage ($+V_A$) of dynamic power supply and a negative voltage ($-V_A$) of dynamic power supply respectively. There are also included resistances 813, 823; Zener diodes 814, 824; and capacitors 815, 825.

Figure 10:
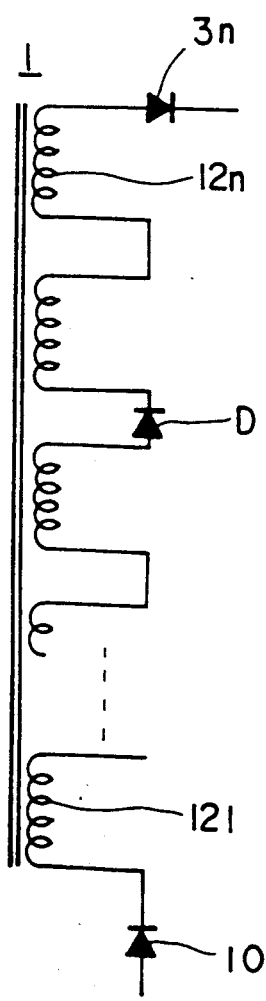
FIGS. 10 and 11 are respectively a drawing to explain showing modified example of a construction for fly-back transformer used in the present invention.
Figure 11:
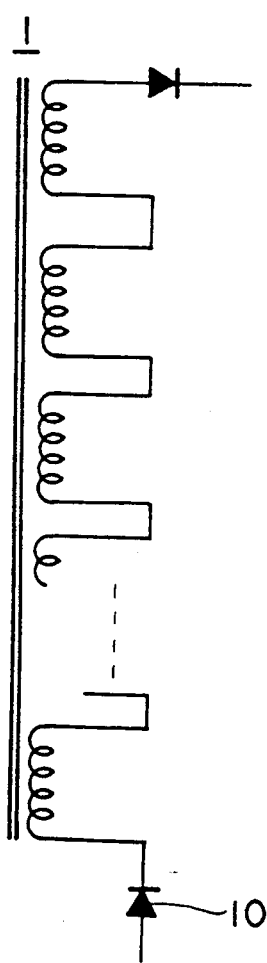

The output coil 12 used in each of the above-described embodiments is a multisingular type divided into a plurality (n) of sections, and sectional coils devided from 121 to 12n respectively are electrically connected to one another via diodes from 31 to 3n. However, the present invention is applicable to another multisingular type where diodes D are electrically connected at a rate of one for a plurality (e.g.two) of sectional coils from 121 to 12n as shown in FIG. 10, also to a winding type where no electrical connection to diode is existent as shown in FIG. 11, and further to a type having a voltage doubler rectifier circuit.

What is claimed is:

1. A device generating high voltage, comprising:
   a circuit means for supplying a DC input signal;
   a fly-back transformer having an output coil and an input coil, said input coil being driven by said circuit means;
   a rectifier circuit means for rectifying an output voltage generated in said output coil of said fly-back transformer to produce a rectified output voltage;
   a capacitor for smoothing said rectified output voltage to produce a smoothed output voltage; and
   a stabilizing means for stabilizing said output voltage, said stabilizing means including:
   (a) a diode which is electrically connected to one terminal of said output coil of said fly-back transformer on a low-voltage side thereof, said diode having an anode side, and said diode being arranged to rectify in a forward direction corresponding to a direction of rectification of said rectifier circuit means;
   (b) a detecting means for detecting said smoothed output voltage and for detecting an input voltage at said input coil, said detecting means producing an output signal based upon the detected said output voltage of said smoothed output signal and said input voltage at said input coil, and
   (c) control means for controlling ground potential at said anode side of said diode so as to maintain said smoothed output at a DC high voltage which is substantially constant.

2. A device generating high voltage as claimed in claim 1, wherein said capacitor is electrically connected between an output side of said rectifier circuit and said anode side of said diode.

3. A device generating high voltage as claimed in claim 1 or claim 2, wherein said voltage stabilizing circuit detects said output voltage of said smoothed output voltage via a divided resistance circuit which includes at least two resistances in series and at least two capacitors electrically connected in parallel with said at least two resistances.

4. A device generating high voltage as claimed in claim 1 or 2, wherein said output coil comprises a plurality of coil sections, and wherein adjacent ones of said coil sections are respectively electrically connected in series to each another via diodes.

5. A high voltage generating circuit comprising:
   a switching circuit for switching a DC input;
   a fly-back transformer whose input coil is driven by pulses delivered from the switching actuation of said switching actuation of said circuit;
   a rectifier circuit for rectifying the fly-back voltage generated in the output coil of said fly-back transformer;
   a capacitor for smoothing the rectified output; and
   a voltage stabilizing circuit;
   wherein a diode is electrically connected to one terminal of said output coil of said fly-back transformer on the low-voltage side thereof as compared with the ground,
   said diode being so determined as to position in forward direction to the direction of rectification;
   said voltage stabilizing circuit is comprised of a voltage sensing circuit for sensing a DC high voltage output, comparing it with a reference voltage applied from a reference voltage source and generating an output of a result of comparison and a control circuit connected between the anode of said diode and the ground terminal;
   said control circuit is comprised of a plurality of transistors including transistors controlled in response to the output from said voltage sensing circuit and a protective circuit for each of the transistors.

* * * * *